US009025222B1

(12) United States Patent
Li et al.

(10) Patent No.: US 9,025,222 B1
(45) Date of Patent: May 5, 2015

(54) SCANNER CALIBRATION USING INVERSE MATRIX

(71) Applicant: Xerox Corporation, Norwalk, CT (US)

(72) Inventors: Xing Li, Webster, NY (US); Zhenhuan Wen, Pittsford, NY (US); Ryan Metcalfe, Fairport, NY (US)

(73) Assignee: Xerox Corporation, Norwalk, CT (US)

( * ) Notice: Subject to any disclaimer, the term of this patent is extended or adjusted under 35 U.S.C. 154(b) by 0 days.

(21) Appl. No.: 14/313,461

(22) Filed: Jun. 24, 2014

(51) Int. Cl.
H04N 1/46 (2006.01)
H04N 1/00 (2006.01)
H04N 1/60 (2006.01)

(52) U.S. Cl.
CPC ....... H04N 1/00023 (2013.01); H04N 1/00018 (2013.01); H04N 1/00045 (2013.01); H04N 1/00087 (2013.01); H04N 1/6008 (2013.01); H04N 1/6005 (2013.01); H04N 2201/0005 (2013.01); H04N 2201/0081 (2013.01)

(58) Field of Classification Search
None
See application file for complete search history.

(56) References Cited

U.S. PATENT DOCUMENTS

| 5,543,940 | A  | * | 8/1996  | Sherman              | 358/518 |
|-----------|----|---|---------|----------------------|---------|
| 5,739,927 | A  | * | 4/1998  | Balasubramanian et al.| 358/518 |
| 6,320,668 | B1 | * | 11/2001 | Kim                  | 358/1.1 |
| 7,259,892 | B2 | * | 8/2007  | Nakajima             | 358/1.9 |
| 7,557,964 | B2 | * | 7/2009  | Smith et al.         | 358/406 |
| 7,576,889 | B2 |   | 8/2009  | Wang                 |         |
| 7,982,910 | B2 | * | 7/2011  | Ishiguchi            | 358/1.9 |
| 8,638,340 | B2 |   | 1/2014  | Holub                |         |
| 2004/0150847 | A1 | * | 8/2004 | Mahy               | 358/1.9 |
| 2006/0164700 | A1 | * | 7/2006 | Hayashi            | 358/518 |
| 2006/0285134 | A1 |   | 12/2006 | Viturro et al.    |         |
| 2010/0002032 | A1 | * | 1/2010 | Yi et al.          | 347/9   |
| 2010/0134858 | A1 | * | 6/2010 | Minamino et al.    | 358/504 |
| 2012/0044540 | A1 |   | 2/2012 | Dalal et al.       |         |

FOREIGN PATENT DOCUMENTS

WO 2007083717 7/2007

* cited by examiner

Primary Examiner — Dung Tran
(74) Attorney, Agent, or Firm — Gibb & Riley, LLC

(57) ABSTRACT

Methods and systems methods calculate an initial matrix by correlating scanned test device-dependent values to device-independent color space values of a test sheet. The initial matrix converts device-dependent values to device-independent color space values; however, the initial matrix does include some conversion error. Such methods then calculate an inverse matrix from the initial matrix. These methods and systems then calculate target device-dependent values by applying the device-independent color space values to the inverse matrix. The methods and systems derive final one-dimensional look-up tables that isolate the conversion error by correlating the scanned test device-dependent values to the device-independent color space values. These methods and systems then derive a final matrix specific to the scanner by first applying the scanned test device-dependent values to the final one-dimensional look-up tables before creating the final matrix. Then, this final matrix can be substituted for the previously calculated conversion matrix used for non-calibration operation.

20 Claims, 4 Drawing Sheets

SCANNER CALIBRATION USING INVERSE MATRIX

BACKGROUND

Systems and methods herein generally relate to scanner calibration and more particularly to scanner calibration processes that transform scanned colors into device-independent color space.

In order to achieve high quality reproduction, it is often advantageous to calibrate optical scanners. Additionally, scanner output (which is often detected as combinations of red, green, and blue (RGB)) into a more precise, generic, device-independent format (such as HSV, CIE XYZ, and CIE L*a*b* values) that can be more easily utilized by all devices. For example, instead of transferring color signals in the RGB space from a scanner directly to color signals in the cyan magenta yellow black (CMYK) space to a color printer, a device-independent color space is commonly used as the intermediate color space for other evolved image processing, such as compression, decompression, enhancement, correction, and the like.

In general, traditional methods of scanner profiling are used to transform the color data (e.g., obtained from a scanner or a linear array sensor) in the device dependent color space to the device independent color space. These traditional methods of scanner profiling use, for example, a matrix or a look-up table (LUT). A 3×3 matrix relates a RGB input to a L*a*b* or XYZ output, with a linear in reflectance like RGB, and converting XYZ output to L*a*b* using standard formulas. Further improvements may be obtained by using a 4×3 matrix, where the additional row represents the offset terms. A look-up table transformation maps a RGB input to a L*a*b* output and often involves interpolation using available LUT entries.

Therefore, much work has been directed toward achieving high accuracy color space transformation. Often, in scanner device RGB to CIE XYZ conversion, a one-dimensional (1D) gray balancing look-up table (LUT) is applied to the input RGB, followed by a matrix conversion to transform the adjusted RGB to CIE XYZ. Such methods are able to produce incremental improvement in the quality of color space transformation, but in order to keep products competitive in terms of cost, quality and performance further improve in color accuracy (without restoring to computationally expensive algorithms) would be useful.

SUMMARY

Various methods herein initialize one-dimensional look-up tables for red-green-blue (device-dependent) channels. The initialization process places one-to-one data (straight line data) that causes output to equal input in each of the look-up tables. The one-dimensional table initialization produces initialized one-dimensional device-dependent look-up tables.

The methods herein scan a test sheet having test patches to produce scanned test device-dependent values using a scanner operatively connected to the computerized device. Also, such methods measure test device-independent color space values of the patches on the test sheet using a relatively higher-quality, higher-resolution color measuring instrument separate from said scanner. These methods then apply the initialized one-dimensional device-dependent look-up tables to the scanned test device-dependent values to leave the scanned test device-dependent values unaltered.

Next, such methods calculate an initial matrix by correlating the scanned test device-dependent values to the test device-independent color space values. The initial matrix converts device-dependent values to device-independent color space values; however, the initial matrix does include some conversion error. Such methods then calculate an inverse matrix from the initial matrix.

Methods herein then calculate target device-dependent values by applying the test device-independent color space values to the inverse matrix. Next, these methods derive final one-dimensional look-up tables for the device-dependent channels by correlating the scanned test device-dependent values and the target device-dependent values. These one-dimensional look-up tables isolate the conversion error and compensate for at least a portion of the conversion error in the initial matrix.

These methods then derive a final matrix specific to the scanner by applying the scanned test device-dependent values to the final one-dimensional look-up tables to produce adjusted device-dependent values, and then correlating the adjusted device-dependent values to the test device-independent color space values. Similarly, the final matrix converts device-dependent values to device-independent color space values, and the final matrix includes less of the conversion error relative to the initial matrix. Then, this final matrix can be substituted for the previously calculated conversion matrix used for non-calibration operations. These and other features are described in, or are apparent from, the following detailed description.

BRIEF DESCRIPTION OF THE DRAWINGS

Various exemplary systems and methods are described in detail below, with reference to the attached drawing figures, in which.

DETAILED DESCRIPTION

Figure 1:
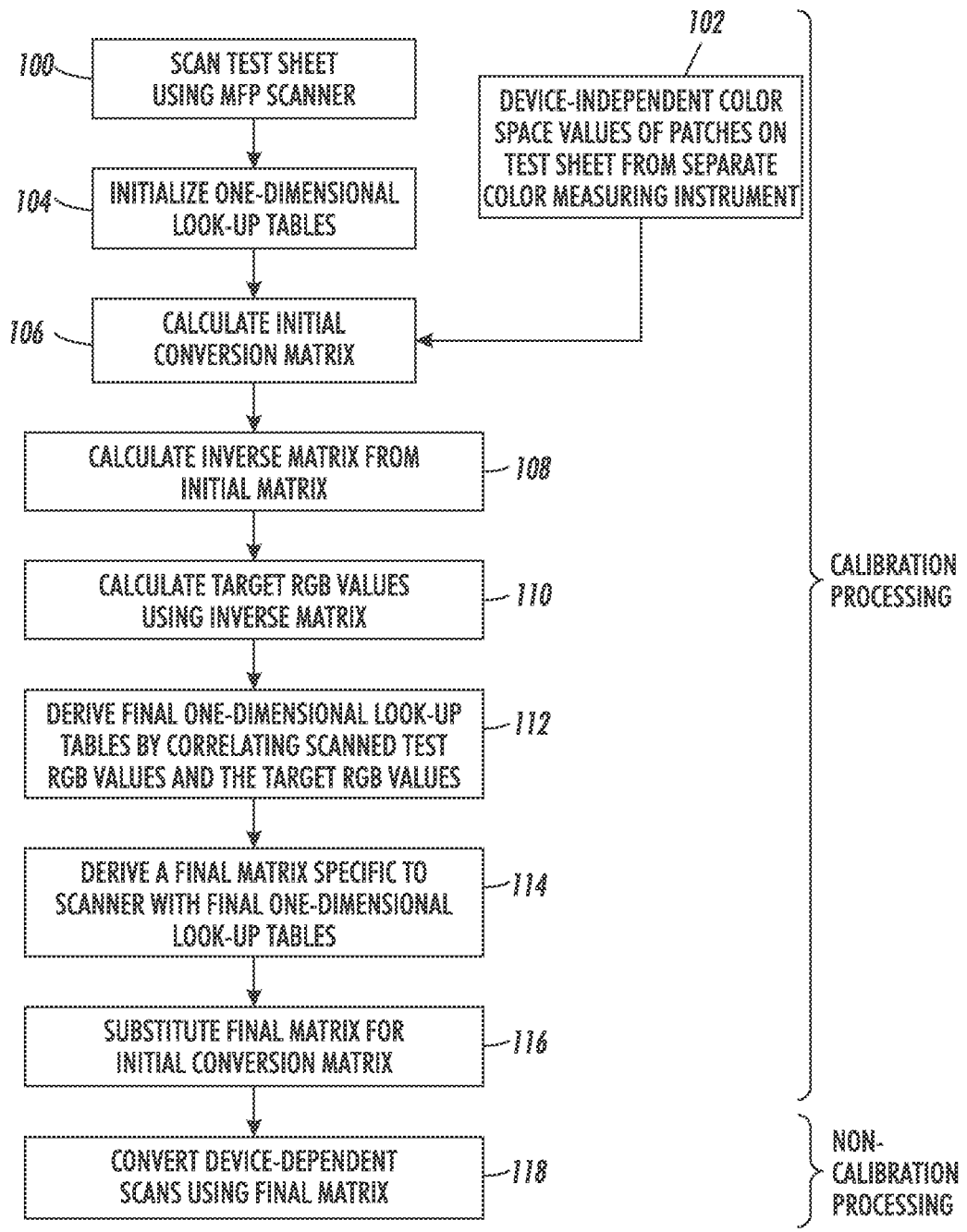
FIG. 1 is a flow diagram of various methods herein.

As mentioned above, further improvements in color space transformation are useful. Therefore, the methods, devices, and systems herein perform color space transformation from device-dependent to device-independent values (e.g., RGB (red, green, blue) to HSV (hue, saturation, value), CIE (Commission Internationale de L'eclairage) XYZ, or CIE L*a*b* (L for lightness and a and b for the color-opponent dimensions).

With devices, systems, and methods herein, the initial "forward" matrix (for device-dependent to device-independent conversion) is inverted and then used to calculate "adjusted" device-dependent values from measured (accurate) device-independent values. Then, two sets of device-dependent values (scanner device-dependent values and the "adjusted" device-dependent values) are correlated to derive a one-dimensional correction look-up table that corrects for the conversion error of the initial matrix. Such methods, devices, and systems provide an effective way to derive color balance parameters that improves the color accuracy, with a low computational overhead.

More specifically, the methods, devices, and systems herein achieve high color accuracy in device-dependent to device-independent transformation by optionally initializing a one-dimensional gray balancing lookup table with one-to-one (1:1) values where output equals input. The methods herein scan a test sheet having test patches to produce scanned test device-dependent values using a scanner operatively connected to the computerized device. These methods can then optionally apply the initialized one-dimensional device-dependent look-up tables to the scanned test device-dependent values to leave the scanned test device-dependent values unaltered.

Also, such methods measure test device-independent color space values of the patches on the test sheet using a relatively higher-quality, higher-resolution color measuring instrument (e.g., a higher-quality scanner or optical detector, such as a spectrophotometer) separate from said scanner. Next, such methods calculate an initial matrix (e.g., a 3×3 matrix) by correlating the scanned test device-dependent values to the test device-independent color space values. The initial 3×3 matrix converts device-dependent values to device-independent color space values; however, the initial matrix does include some conversion error.

An inverse matrix (e.g., 3×3 matrix) is then mathematically calculated from the accurate 3×3 matrix that was established using the initialized one-dimensional lookup table. Because the inverse 3×3 matrix is just the mathematical inverse of the accurate 3×3 matrix, the inverse 3×3 matrix is identical to the accurate 3×3 matrix except that the inverse 3×3 matrix transforms pixel values from device-independent color space (XYZ color space) to device-dependent color space (RGB color space) while the initial 3×3 matrix performs the opposite transformation.

The test device-independent color space values (measured XYZ values) are then applied to the inverse 3×3 matrix to produce "target" device-dependent (RGB) values from the measured XYZ values for all the patches in the target. These target RGB values are then correlated with the scanned test device-dependent values (RGB data) to find differences on a pixel-by-pixel basis and to produce calibrated one-dimensional lookup tables (calibrated 1D LUTs) for each of the color channels. These one-dimensional look-up tables isolate and identify the conversion error so that the look-up tables can compensate for at least a portion of the conversion error in the initial matrix.

Then, these methods derive a final matrix specific to the scanner by applying the scanned test device-dependent values to the final one-dimensional look-up tables to first produce adjusted device-dependent values, and then correlating the adjusted device-dependent values to the test device-independent color space values. Similarly, the final matrix converts device-dependent values to device-independent color space values, but the final matrix includes less of the conversion error relative to the initial matrix. Then, this final matrix can be substituted for the previously calculated conversion matrix used for non-calibration operations. Thus, the final calibration 3×3 matrix replaces the initial calibration 3×3 matrix. This method is able to achieve significantly higher color accuracy than with the existing practice, and additional iterations can help refine the results.

Such methods are shown in FIG. 1. In item 100, the methods herein scan a test sheet that has test patches (to produce scanned test device-dependent values) using the scanner integral with the printing device (the scanner that is a component of the printing device). In item 102, these methods obtain device-independent color space values of the patches on the test sheet that were previously measured using a relatively higher-precision, more expensive color measuring instrument (that is separate from the scanner in the printer that was used to produce scanned test device-dependent values in item 100 (e.g., higher-quality scanner, spectrophotometer, etc.)).

In item 104, such methods herein optionally initialize one-dimensional look-up tables for red-green-blue (device-dependent) channels. The initialization process in item 104 places one-to-one data (straight line data) that causes output to equal input in each of the look-up tables. The one-dimensional table initialization in item 104 produces initialized one-dimensional device-dependent look-up tables. The scanned test device-dependent values can optionally be applied to the initialized tables to leave the scanned test device-dependent values unaltered.

These methods then calculate an initial matrix in item 106 by correlating the unaltered scanned test device-dependent values from item 100 or 104 to the test device-independent color space values from item 102 (e.g., using the data unaltered by the initialized one-dimensional device-dependent look-up tables in item 104). The initial matrix is generated in item 106 using known-processes that create functions and curves that convert, on a color channel-by-channel basis, device-dependent values to device-independent color space values, such as HSV, CIE XYZ, and CIE L*a*b* values. However, these well-known matrix creation processes are imperfect and introduce some conversion errors that prevent device-dependent values from being transformed to device-independent color space values with exact precision. Following this, these methods calculate an inverse matrix from the initial matrix in item 108 using standard matrix inversion techniques (e.g., well-known generic mathematical techniques for matrix inversion). The inverse matrix maintains the same conversion error (in inverse) of the initial matrix because the inverse matrix is an exact mathematical inverse of the initial matrix.

In item 110, these methods calculate target device-dependent values by applying the test device-independent color space values (from item 102) to the inverse matrix (from item 108). This allows the methods to derive final one-dimensional look-up tables for the device-dependent channels in item 112 by correlating scanned test device-dependent values (from item 100) and the target device-dependent values (from item 110). Again, these one-dimensional look-up tables isolate and identify at least a portion of the conversion error so that the look-up tables can compensate for at least a portion of the conversion error in the initial matrix.

With the final one-dimensional lookup tables calculated in item 112, these methods then derive a final matrix specific to the scanner in item 114. Before actually creating the final matrix, in item 114, these methods first apply the scanned test device-dependent values (from item 100) to the final one-dimensional look-up tables (from item 112) to produce adjusted device-dependent values. Then in item 114, these methods then correlate these adjusted device-dependent values to the test device-independent color space values (from item 102), again using well-known matrix creation processes. Then, this final matrix can be substituted for the initial conversion matrix used for non-calibration operation, as shown by item 116. In non-calibration operation, the methods herein correct scans produced by the scanner by converting the device-dependent scans to device-independent color space values using the final matrix, as shown in item 118.

As noted above, the initial matrix calculated (in item 106) does include some conversion error caused by the matrix creation processes. By applying the exact same device-independent test device-independent color space values (from item 102) used to create the initial matrix (in item 106) to the inverse matrix (in item 110), a large amount (or potentially all) of this conversion error can be isolated and identified when the original scanned test device-dependent values (also used to create the initial matrix) and the target device-dependent values (from item 110) are compared and correlated (in item 112).

In other words, if the initial matrix (from item 106) were free of error, applying the same device-independent color space values (from item 102) to the mathematical inverse of the error-free initial matrix would reproduce the scanned test device-dependent values (from item 100) exactly. However, because the process of creating the initial matrix (in item 106) is imperfect, it does introduce some error, and the scanned test device-dependent values (from item 100) will be different than the target device-dependent values (from item 110) and this difference is represented (and countered by) the final one-dimensional lookup tables (calculated in item 112). Applying the final one-dimensional lookup tables calculated in item 112 to the scanned test device-dependent values (from item 100) before correlating such values to the device-independent color space values (from item 102), removes much of the conversion error introduced in item 106 and, therefore, the final matrix produced in item 114 includes much less of the conversion error relative to the initial matrix.

Figure 2:
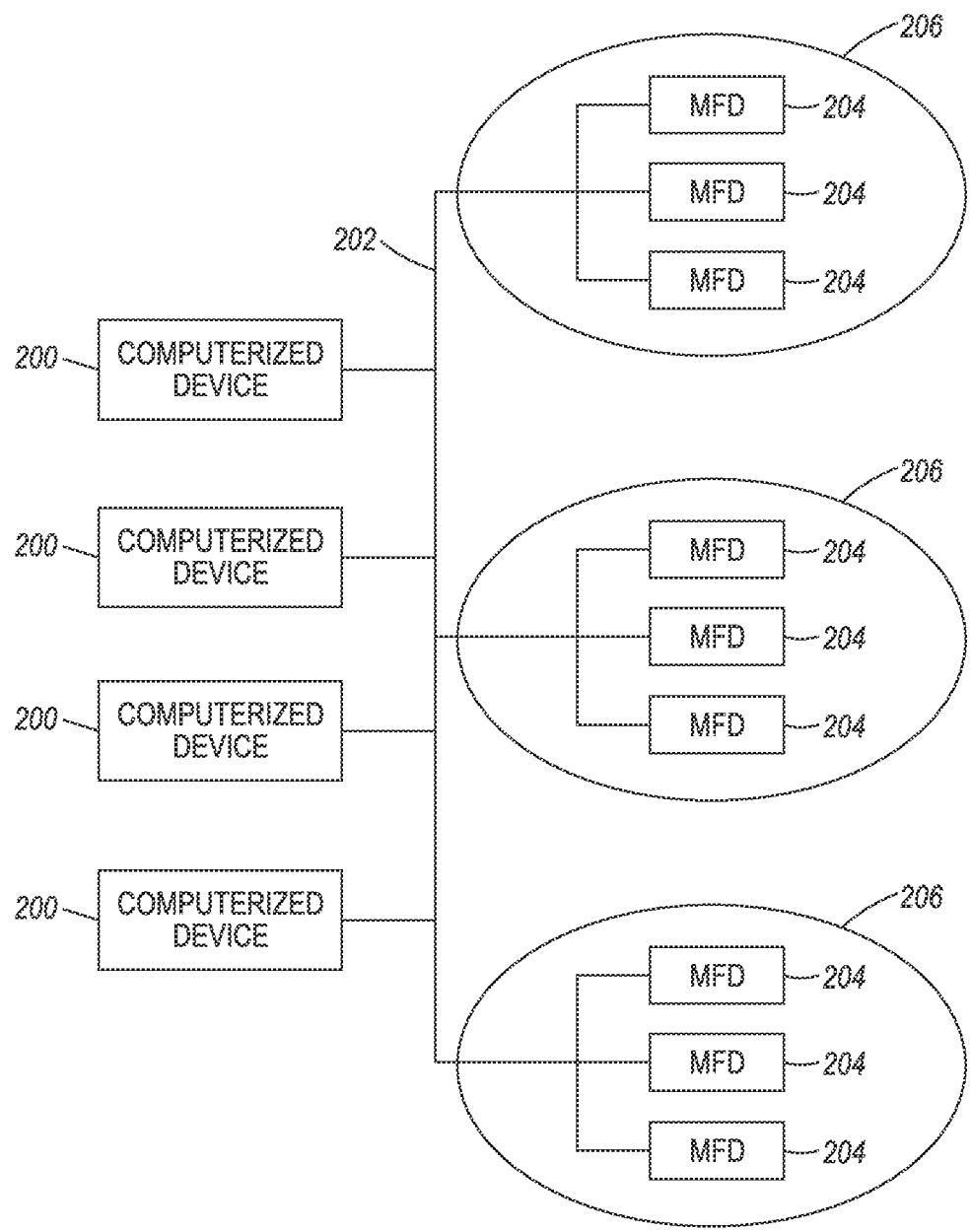
FIG. 2 is a schematic diagram illustrating systems herein.

As shown in FIG. 2, exemplary systems and methods herein include various computerized devices 200, 204 located at various different physical locations 206. The computerized devices 200, 204 can include print servers, printing devices, personal computers, etc., and are in communication (operatively connected to one another) by way of a local or wide area (wired or wireless) network 202.

Figure 3:
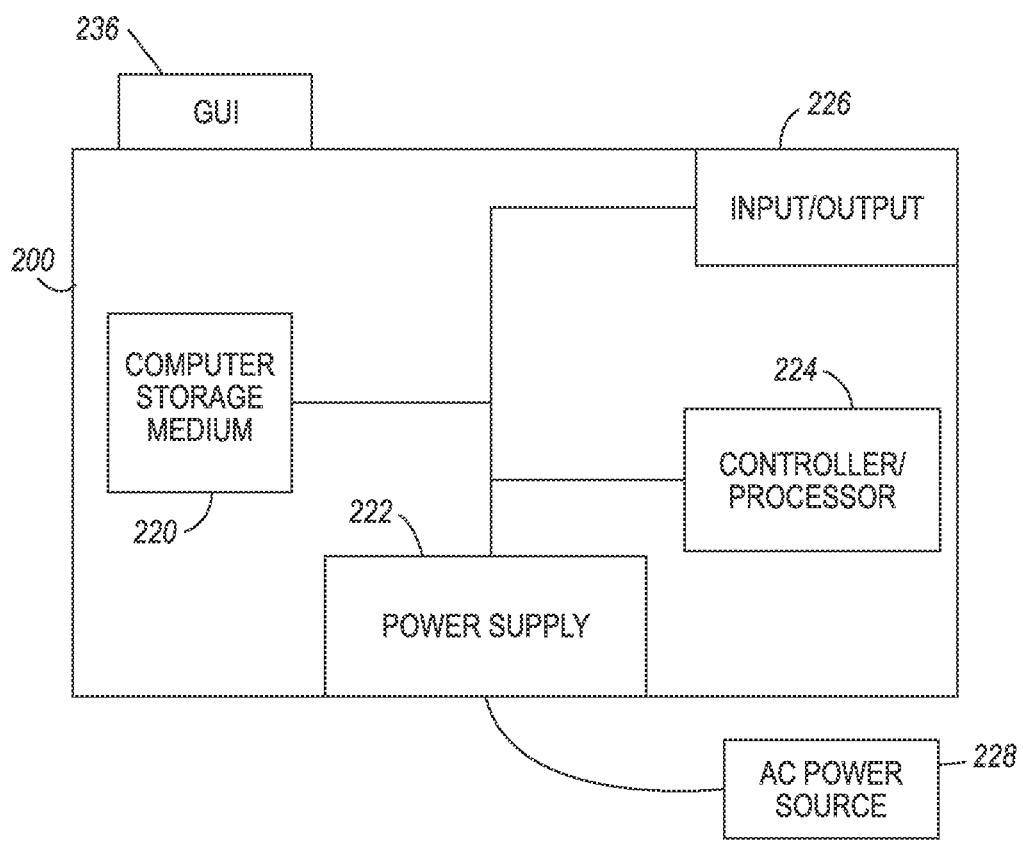
FIG. 3 is a schematic diagram illustrating devices herein.

FIG. 3 illustrates a computerized device 200, which can be used with systems and methods herein and can comprise, for example, a print server, a personal computer, a portable computing device, etc. The computerized device 200 includes a controller/tangible processor 224 and a communications port (input/output) 226 operatively connected to the tangible processor 224 and to the computerized network 202 external to the computerized device 200. Also, the computerized device 200 can include at least one accessory functional component, such as a graphic user interface assembly 236 that also operate on the power supplied from the external power source 228 (through the power supply 222).

The input/output device 226 is used for communications to and from the computerized device 200. The tangible processor 224 controls the various actions of the computerized device. A non-transitory computer storage medium device 220 (which can be optical, magnetic, capacitor based, etc.) is readable by the tangible processor 224 and stores instructions that the tangible processor 224 executes to allow the computerized device to perform its various functions, such as those described herein. Thus, as shown in FIG. 3, a body housing has one or more functional components that operate on power supplied from an alternating current (AC) source 228 by the power supply 222. The power supply 222 can comprise a power storage element (e.g., a battery, etc).

Figure 4:
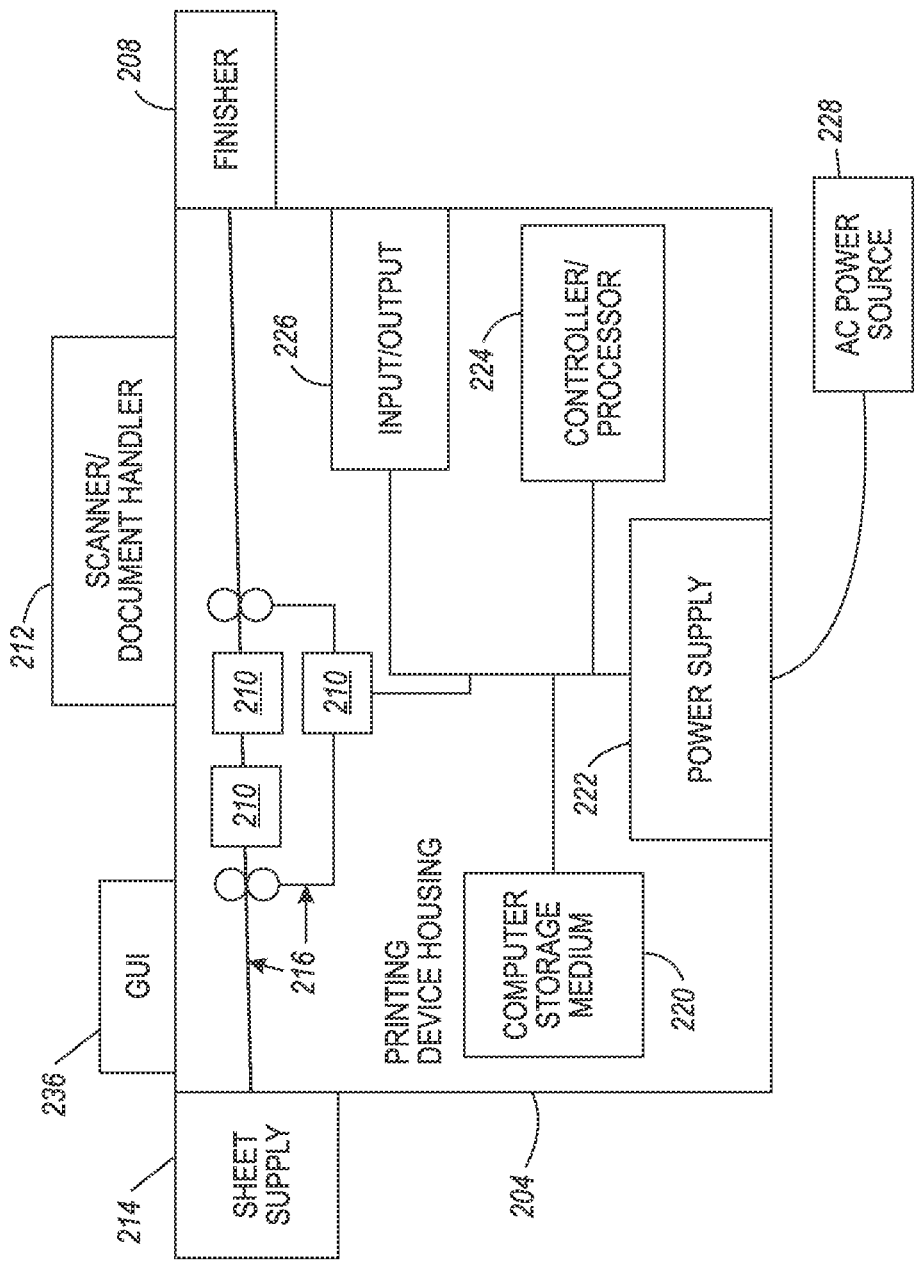
FIG. 4 is a schematic diagram illustrating devices herein.

FIG. 4 illustrates a computerized device that is a printing device 204, which can be used with systems and methods herein and can comprise, for example, a printer, copier, multi-function machine, multi-function device (MFD), etc. The printing device 204 includes many of the components mentioned above and at least one marking device (printing engines) 210 operatively connected to the tangible processor 224, a media path 216 positioned to supply sheets of media from a sheet supply 214 to the marking device(s) 210, etc. After receiving various markings from the printing engine(s), the sheets of media can optionally pass to a finisher 208 which can fold, staple, sort, etc., the various printed sheets. Also, the printing device 204 can include at least one accessory functional component (such as a scanner/document handler 212, etc.) that also operates on the power supplied from the external power source 228 (through the power supply 222).

The devices and systems herein shown in FIGS. 2-4 include a scanner 212 operatively connected to the processor 224. One of the scanners 212 can be a lower-quality scanner that scans a test sheet having test patches to produce scanned test device-dependent values. Further, another of the scanners 212 (of a different device 204) can be a color measuring instrument (e.g., higher-quality scanner, spectrophotometer, etc.) operatively connected to another of the processors 224. The color measuring instrument is separate from the lower-quality scanner (and can, for example, be included with different devices 204 of the many devices 204 shown in FIG. 2). The color measuring instrument has a much higher quality, higher resolution, is more expensive, relative to the relatively lower-quality, lower-resolution scanner; and the color measuring instrument can include logic to output device-independent color space values.

The color measuring instrument 212 thus measures test device-independent color space values of the patches on the test sheet. The processor 224 automatically calculates an initial matrix by correlating the scanned test device-dependent values to the test device-independent color space values. The initial matrix converts device-dependent values to device-independent color space values; however, the initial matrix includes conversion error.

The processor 224 automatically calculates an inverse matrix from the initial matrix, and the processor 224 automatically calculates target device-dependent values by applying the test device-independent color space values to the inverse matrix. The processor 224 automatically derives final one-dimensional look-up tables for the device-dependent channels by correlating the scanned test device-dependent values and the target device-dependent values. The one-dimensional look-up tables compensate for at least a portion of the conversion error.

The processor 224 automatically derives a final matrix specific to the scanner 212 by: applying the scanned test device-dependent values to the final one-dimensional look-up tables to produce adjusted device-dependent values; and correlating the adjusted device-dependent values to the test device-independent color space values. The final matrix converts device-dependent values to device-independent color space values, and the final matrix includes less of the conversion error relative to the initial matrix.

As would be understood by those ordinarily skilled in the art, the printing device 204 shown in FIG. 4 is only one example and the systems and methods herein are equally applicable to other types of printing devices that may include fewer components or more components. For example, while a limited number of printing engines and paper paths are illustrated in FIG. 4, those ordinarily skilled in the art would understand that many more paper paths and additional printing engines could be included within any printing device used with systems and methods herein.

While some exemplary structures are illustrated in the attached drawings, those ordinarily skilled in the art would understand that the drawings are simplified schematic illustrations and that the claims presented below encompass many more features that are not illustrated (or potentially many less) but that are commonly utilized with such devices and systems. Therefore, Applicants do not intend for the claims presented below to be limited by the attached drawings, but instead the attached drawings are merely provided to illustrate a few ways in which the claimed features can be implemented.

Many computerized devices are discussed above. Computerized devices that include chip-based central processing units (CPU's), input/output devices (including graphic user interfaces (GUI), memories, comparators, tangible processors, etc.) are well-known and readily available devices produced by manufacturers such as Dell Computers, Round Rock Tex., USA and Apple Computer Co., Cupertino Calif., USA. Such computerized devices commonly include input/output devices, power supplies, tangible processors, electronic storage memories, wiring, etc., the details of which are omitted herefrom to allow the reader to focus on the salient aspects of the systems and methods described herein. Similarly, scanners and other similar peripheral equipment are available from Xerox Corporation, Norwalk, Conn., USA and the details of such devices are not discussed herein for purposes of brevity and reader focus.

The terms printer or printing device as used herein encompasses any apparatus, such as a digital copier, bookmaking machine, facsimile machine, multi-function machine, etc., which performs a print outputting function for any purpose. The details of printers, printing engines, etc., are well-known and are not described in detail herein to keep this disclosure focused on the salient features presented. The systems and methods herein can encompass systems and methods that print in color, monochrome, or handle color or monochrome image data. All foregoing systems and methods are specifically applicable to electrostatographic and/or xerographic machines and/or processes.

A "pixel" refers to the smallest segment into which an image can be divided. Received pixels of an input image are associated with a color value defined in terms of a color space, such as color, intensity, lightness, brightness, or some mathematical transformation thereof. Thus, an image input device is any device capable of obtaining color pixel values from a color image. The set of image input devices is intended to encompass a wide variety of devices such as, for example, digital document devices, computer systems, memory and storage devices, networked platforms such as servers and client devices which can obtain pixel values from a source device, and image capture devices. The set of image capture devices includes scanners, cameras, photography equipment, facsimile machines, photo reproduction equipment, digital printing presses, xerographic devices, and the like. A scanner is one image capture device that optically scans images, print media, and the like, and converts the scanned image into a digitized format. Common scanning devices include variations of the flatbed scanner, generally known in the arts, wherein specialized image receptors move beneath a platen and scan the media placed on the platen. Modern digital scanners typically incorporate a charge-coupled device (CCD) or a contact image sensor (CIS) as the image sensing receptor(s). The scanning device produces a signal of the scanned image data. Such a digital signal contains information about pixels such as color value, intensity, and their location within the scanned image.

Further, an image output device is any device capable of rendering the image. The set of image output devices includes digital document reproduction equipment and other copier systems as are widely known in commerce, photographic production and reproduction equipment, monitors and other displays, computer workstations and servers, including a wide variety of color marking devices, and the like. Further, the terms automated or automatically mean that once a process is started (by a machine or a user), one or more machines perform the process without further input from any user.

It will be appreciated that the above-disclosed and other features and functions, or alternatives thereof, may be desirably combined into many other different systems or applications. Various presently unforeseen or unanticipated alternatives, modifications, variations, or improvements therein may be subsequently made by those skilled in the art which are also intended to be encompassed by the following claims. Unless specifically defined in a specific claim itself, steps or components of the systems and methods herein cannot be implied or imported from any above example as limitations to any particular order, number, position, size, shape, angle, color, or material.

What is claimed is:

1. A method comprising:
   scanning a test sheet having test patches to produce scanned test device-dependent values using a scanner;
   measuring test device-independent color space values of said patches on said test sheet using a color measuring instrument separate from said scanner;
   calculating an initial matrix by correlating said scanned test device-dependent values to said test device-independent color space values, said initial matrix converting device-dependent values to device-independent color space values, and said initial matrix including conversion error;
   calculating an inverse matrix from said initial matrix;
   calculating target device-dependent values by applying said test device-independent color space values to said inverse matrix;
   deriving final one-dimensional look-up tables by correlating said scanned test device-dependent values and said target device-dependent values, said one-dimensional look-up table compensating for at least a portion of said conversion error; and
   deriving a final matrix specific to said scanner by applying said scanned test device-dependent values to said final one-dimensional look-up tables to produce adjusted device-dependent values, and correlating said adjusted device-dependent values to said test device-independent color space values, said final matrix converting device-dependent values to device-independent color space values, and said final matrix including less of said conversion error relative to said initial matrix.

2. The method according to claim 1, said calculating an initial matrix using unaltered versions of said scanned test device-dependent values.

3. The method according to claim 1, further comprising correcting scans produced by said scanner by converting said device-dependent values to corrected device-independent color space values using said final matrix.

4. The method according to claim 1, said device-independent values comprising HSV, CIE XYZ, and CIE L*a*b* values.

5. The method according to claim 1, said device-dependent values comprising red, green, blue (RGB) values.

6. A method comprising:
   scanning a test sheet having test patches to produce scanned test device-dependent values using a scanner;
   measuring test device-independent color space values of said patches on said test sheet using a color measuring instrument separate from said scanner;
   calculating an initial 3×3 conversion matrix by correlating said scanned test device-dependent values to said test device-independent color space values, said initial 3×3 conversion matrix converting device-dependent values to device-independent color space values, and said initial 3×3 conversion matrix including conversion error;
   calculating an inverse 3×3 conversion matrix from said initial 3×3 conversion matrix;
   calculating target device-dependent values by applying said test device-independent color space values to said inverse 3×3 conversion matrix;

deriving final one-dimensional look-up tables by correlating said scanned test device-dependent values and said target device-dependent values, said one-dimensional look-up table compensating for at least a portion of said conversion error; and deriving a final 3×3 conversion matrix specific to said scanner by applying said scanned test device-dependent values to said final one-dimensional look-up tables to produce adjusted device-dependent values, and correlating said adjusted device-dependent values to said test device-independent color space values, said final 3×3 conversion matrix converting device-dependent values to device-independent color space values, and said final 3×3 conversion matrix including less of said conversion error relative to said initial 3×3 conversion matrix.

7. The method according to claim 6, said calculating an initial 3×3 conversion matrix using unaltered versions of said scanned test device-dependent values.

8. The method according to claim 6, further comprising correcting scans produced by said scanner by converting said device-dependent values to corrected device-independent color space values using said final 3×3 conversion matrix.

9. The method according to claim 6, said device-independent values comprising HSV, CIE XYZ, and CIE L*a*b* values.

10. The method according to claim 6, said device-dependent values comprising red, green, blue (RGB) values.

11. A system comprising:
a processor;
a scanner operatively connected to said processor, said scanner scanning a test sheet having test patches to produce scanned test device-dependent values; and
a color measuring instrument operatively connected to said processor,
said color measuring instrument being separate from said scanner,
said color measuring instrument measuring test device-independent color space values of said patches on said test sheet,
said processor automatically calculating an initial matrix by correlating said scanned test device-dependent values to said test device-independent color space values,
said initial matrix converting device-dependent values to device-independent color space values,
said initial matrix including conversion error,
said processor automatically calculating an inverse matrix from said initial matrix,
said processor automatically calculating target device-dependent values by applying said test device-independent color space values to said inverse matrix,
said processor automatically deriving final one-dimensional look-up tables by correlating said scanned test device-dependent values and said target device-dependent values,
said one-dimensional look-up table compensating for at least a portion of said conversion error, and
said processor automatically deriving a final matrix specific to said scanner by applying said scanned test device-dependent values to said final one-dimensional look-up tables to produce adjusted device-dependent values, and correlating said adjusted device-dependent values to said test device-independent color space values,
said final matrix converting device-dependent values to device-independent color space values, and
said final matrix including less of said conversion error relative to said initial matrix.

12. The system according to claim 11, said processor calculating an initial matrix using unaltered versions of said scanned test device-dependent values.

13. The system according to claim 11, said processor automatically correcting scans produced by said scanner by converting said device-dependent values to corrected device-independent color space values using said final matrix.

14. The system according to claim 11, said device-independent values comprising HSV, CIE XYZ, and CIE L*a*b* values.

15. The system according to claim 11, said device-dependent values comprising red, green, blue (RGB) values.

16. A tangible, non-transitory computer storage medium readable by computerized device and storing instructions executable by said computerized device to perform a method comprising:
scanning a test sheet having test patches to produce scanned test device-dependent values;
measuring test device-independent color space values of said patches on said test sheet;
calculating an initial matrix by correlating said scanned test device-dependent values to said test device-independent color space values, said initial matrix converting device-dependent values to device-independent color space values, and said initial matrix including conversion error;
calculating an inverse matrix from said initial matrix;
calculating target device-dependent values by applying said test device-independent color space values to said inverse matrix;
deriving final one-dimensional look-up tables by correlating said scanned test device-dependent values and said target device-dependent values, said one-dimensional look-up tables compensating for at least a portion of said conversion error; and
deriving a final matrix by applying said scanned test device-dependent values to said final one-dimensional look-up tables to produce adjusted device-dependent values, and correlating said adjusted device-dependent values to said test device-independent color space values, said final matrix converting device-dependent values to device-independent color space values, and said final matrix including less of said conversion error relative to said initial matrix.

17. The tangible, non-transitory computer storage medium according to claim 16, said calculating an initial matrix using unaltered versions of said scanned test device-dependent values.

18. The tangible, non-transitory computer storage medium according to claim 16, further comprising correcting scans by converting said device-dependent values to corrected device-independent color space values using said final matrix.

19. The tangible, non-transitory computer storage medium according to claim 16, said device-independent values comprising HSV, CIE XYZ, and CIE L*a*b* values.

20. The tangible, non-transitory computer storage medium according to claim 16, said device-dependent values comprising red, green, blue (RGB) values.

* * * * *